United States Patent Office 2,733,137
Patented Jan. 31, 1956

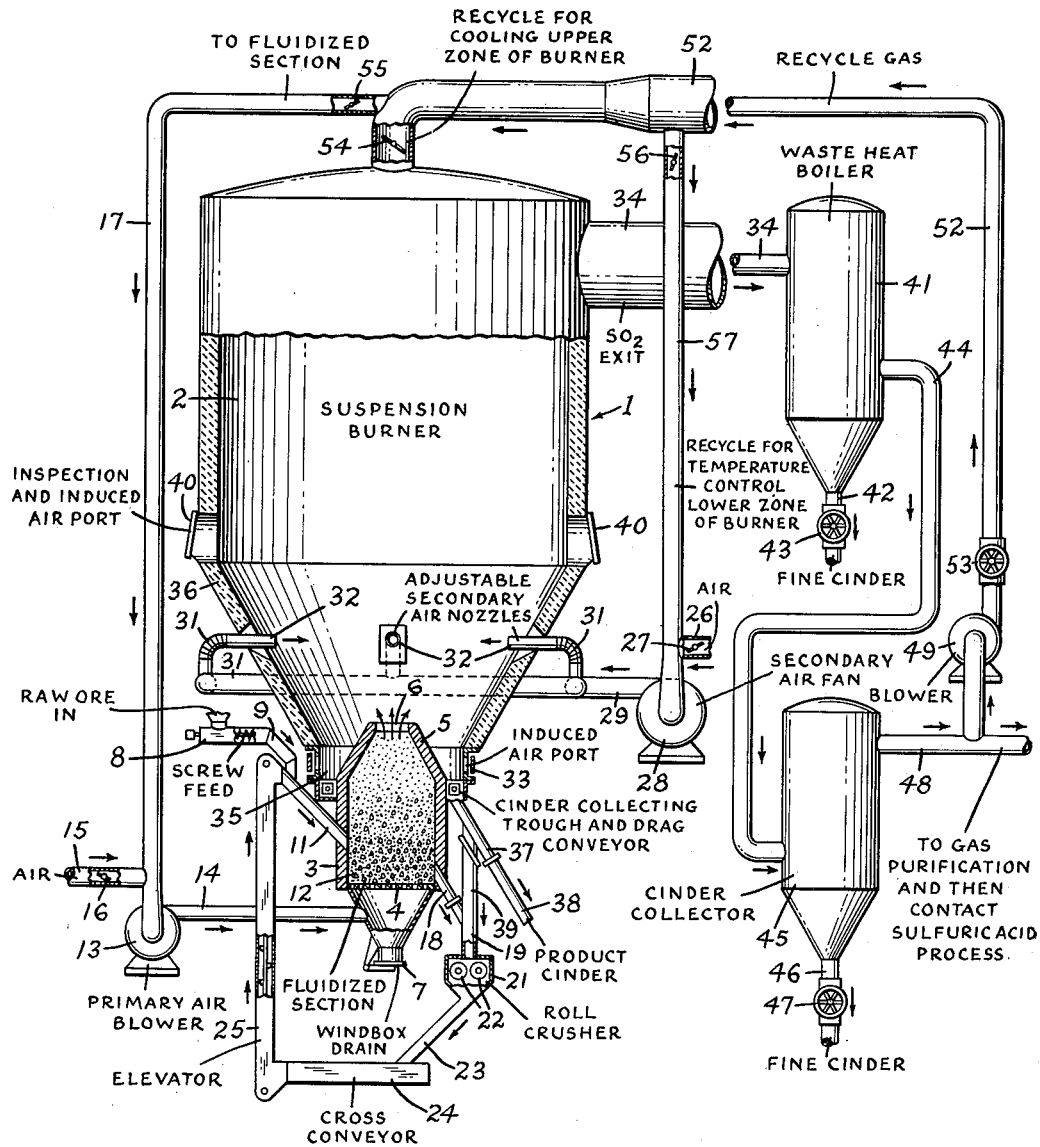

2,733,137

APPARATUS FOR EFFECTING FLUIDIZATION AND SUSPENSION ROASTING OF METALLIC SULFIDE ORES

James W. Swaine, Manhasset, N. Y., and John C. Sloan, Jr., Neptune, N. J., assignors to Allied Chemical & Dye Corporation, New York, N. Y., a corporation of New York Application August 21, 1952, Serial No. 305,642

6 Claims. (Cl. 23—277)

This invention relates to the treatment of sulfide ore and more particularly refers to new and improved apparatus and method for converting metal sulfides to $SO_2$ gas and metal oxides.

Our co-filed application Serial No. 305,643, filed August 21, 1952, describes a two-stage fluid suspension method of roasting iron ore. The present application is directed to apparatus for effecting roasting of metal sulfide ore in a combined fluid-suspension process.

One object of the invention is to provide efficient means of carrying out fluidization, drying, comminution, elutriation and suspension roasting in a unitary apparatus.

Another object of this invention is to provide an ore burner having improved combustion characteristics and increased capacity of suspension burning for continuously converting metallic sulfide ores into $SO_2$ and metal oxide.

A further object of the present invention is to provide apparatus for converting iron sulfide ores into high yields of $SO_2$ gas and cinder low in sulfur content adapted for use in reduction to metallic iron.

Other objects and advantages will be apparent from the following description and accompanying drawing.

In accordance with the present invention apparatus for effecting fluidization and suspension roasting of metallic sulfide ores comprises in combination, an enlarged combustion chamber for effecting suspension roasting of ore, a second smaller fluidization chamber adapted to maintain a bed of solids therein in a fluid state, an opening in said second chamber communicating with said first chamber to permit discharge of gas and finely divided suspended solid particles into the first chamber, an ore inlet into the second chamber, an inlet in the bottom of the second chamber for the introduction of gas to maintain a bed of solids therein in fluid state and elutriate therefrom finely divided solid particles, an inlet in the first chamber for the introduction of air, and an outlet in the first chamber for the discharge therefrom of gas containing $SO_2$.

One specific embodiment of the invention comprises an enlarged combustion chamber for roasting finely divided iron sulfide ore particles suspended in a gaseous medium, a second smaller fluidization chamber embodied in the bottom of said first chamber with an upper portion of said second chamber extending upwardly into said first chamber and a lower portion of said second chamber extending downwardly from the bottom of said first chamber, the bottom walls of the first chamber being spaced from the upper walls of the second chamber to form an annular trough for the collection of cinder settling in said first chamber, said second chamber having its upper walls inwardly inclined forming a restricted opening at the top of the second chamber, a perforated plate in the lower half of the second chamber adapted to support a bed of solids, an ore inlet into the second chamber above the perforated plate, an inlet into the second chamber below the perforated plate for the introduction of gas to maintain a bed of solids therein in a fluid state, a discharge conduit connected to the second chamber above the perforated plate for the withdrawal of a portion of the bed of solids, a crusher for crushing large particles of ore withdrawn from the bed of solids, a conveyor for returning the crushed ore to the bed of solids in the second chamber, an outlet in the annular trough for the discharge of cinder from the bottom of the first chamber, an inlet near the bottom of the first chamber for the introduction of air, an outlet near the top of the first chamber for the discharge therefrom of gas containing $SO_2$, a waste heat boiler for recovering heat from the gas containing $SO_2$ connected to said discharge outlet, a cinder collector chamber for separating cinder from the cooled gas discharged from the waste heat boiler, a conduit connected to the cinder collector for the discharge of gas containing $SO_2$, a conduit means for recycling a portion of the gas containing $SO_2$ to the second chamber, and conduit means for recycling a portion of the gas containing $SO_2$ to the top of the first chamber.

The accompanying drawing illustrates the present invention.

Referring to the drawing, the fluid-suspension burner designated generally by numeral 1 is constructed of an enlarged combustion chamber 2 called suspension burner and a smaller fluidization chamber 3 embodied in the bottom of suspension burner 2 and communicating therewith. The sizes of chambers 2 and 3 will of course vary with the capacity of the unit in terms of tonnage of ore per day to be processed. For most commercial operations a suspension burner having a diameter of 15'–30' and a height of 30'–50' and a fluidization chamber having a diameter of 3'–10' and a height of 8'–20' will be found satisfactory. Chamber 3 is disposed in the bottom of chamber 2 in such manner that the upper open end of chamber 3 discharges directly into the bottom of chamber 2. In the preferred form of structure the upper portion of chamber 3 extends upwardly into chamber 2, and the lower portion of chamber 3 extends downwardly from the bottom of chamber 2. The upper walls 5 are inwardly inclined forming a restricted opening at the top of chamber 2. The inwardly inclined walls act in a nature of a baffle to retard the passage of oversize solid particles out of chamber 2. Restriction of the opening 6 at the top of chamber 3 creates a zone of high velocity at that point causing suspended solid particles in the gases leaving chamber 3 to move a greater distance upwardly in suspension burner 2. Near the bottom of chamber 3 is disposed a perforated plate or screen 4 to support a bed of solids. During shutdown, fine particles of dust which fall through perforated plate 4 may be withdrawn through windbox drain 7.

Raw ore consisting of iron pyrites of pyrrhotite or a mixture of both, crushed to a size desirably not exceeding ½" in diameter, is charged into the system through a pressure seal-type screw 8 down through conduits 9 and 11 into fluidization chamber 3. The raw ore is immediately mixed into the bed of solids 12 contained in chamber 3 by the violent turbulent action of the bed. A portion of the oxidizable content of the ore reacts with oxygen contained in the fluidizing gas passing upwardly through bed 12 and sufficient heat is generated to raise the bulk temperature of the ore particles and gas leaving the top of chamber 3 through opening 6 to a temperature in excess of 1300° F.

Fluidizing and oxidizing gas is forced by air blower 13 through line 14 into chamber 3 below perforated plate 4 and then passes upwardly through the bed of solids 12. The gas passing upwardly in chamber 3 through bed 12 should be at a sufficiently high velocity to maintain the bed in a fluid state and simultaneously elutriate from the bed, particles of ore not exceeding 40 mesh size. This velocity will vary depending on the characteristics of the solids used, as will be now explained. At low gas velocities, the bed of solids remains fixed and the individual particles do not move. As the gas velocity is increased, a point is reached at which the bed becomes expanded and is at the absolute minimum bulk density possible, about 55–70% of original bulk density, without movement of the individual particles relative to each other. This condition may be referred to as the state of "incipient fluidization." A slight increase in gas velocity will then cause the bed to become fluidized with only insignificant carry-over of the finer particles. As the velocity is further increased, action of the bed becomes more and more violent with the formation of two distinct phases: (a) a "dense phase" at the base of the vessel containing most of the solids, and (b) a "dilute phase" containing only a relatively small proportion of solids. Further increase in velocity will cause the densities of the dense phase and dilute phase to become equal, forming a single dispersed suspension similar to the nature of a pneumatic conveying system. In the present invention, the velocity through the bed of solids 12 should be sufficiently high to maintain at least two distinct phases, namely a lower dense phase and an upper dilute phase, and to carry over in suspension in the gas, particles of ore smaller than 40 mesh size. The formation of a dense phase and a dilute phase in chamber 3 may be visually observed by means of sight glasses or by means of pressure differentials not shown in the drawing. The properties of the fluidizing gas within the range of operating conditions, such as gas density, pressure, temperature and viscosity have little effect on fluidization of the bed of solids. The effect of characteristics of the solids is much more pronounced. Solids characteristics which materially effect fluidization are density, shape, surface roughness, diameter, and size distribution grading. Merely by way of illustration, a linear gas velocity of 7–9 feet per second will elutriate and maintain in fluid condition a bed of ore solids having the following composition:

| Mesh size: | Percent |
|---|---|
| + 4 | 2.7 |
| −4+ 8 | 28.0 |
| −8+ 14 | 13.9 |
| −14+ 48 | 11.3 |
| −48+ 65 | 5.2 |
| −65+100 | 5.4 |
| −100+200 | 11.7 |
| −200 | 21.8 |

The amount of air, or more accurately, the amount of oxygen, should be sufficient to maintain the bulk temperature of the bed 12 above the auto-ignition point of the ore, about 800° F., and below the sintering temperature, about 1800° F., in order to attain rapid drying and reaction rate, reduce explosion hazards and provide highly preheated feed to the suspension burner. Preferred temperature range is between 1300° F. and 1500° F. Chamber 3 should preferably be operated under slight super-atmospheric pressure, about 1 p. s. i. g., because of simplified gas handling requirements. Excessive high pressures are unnecessary and add to the investment cost. The amount of air required will be dependent in part upon the moisture content of the ore, the quantity of air of course increasing with wetter ores. The amount of air can be controlled by regulating the air intake of line 15 by means of valve 16 and blower 13. If it is found that the amount of air introduced into chamber 3 is adequate to maintain the bed of solids 12 at the desired temperature and to properly dry the ore therein, but insufficient to elutriate the bed of solids 12, then a non-oxidizing gas, as for example, recycle gas, which is primarily a mixture of nitrogen and $SO_2$, is added through conduit 17 to the stream of air entering through line 15 in an amount sufficient to maintain the bed of solids 12 in a fluid state and to elutriate fine particles therefrom. Complete oxidation of the ore in chamber 3 is not accomplished or desired— only partial oxidation of the ore is effected in chamber 3 and completion of oxidation occurs in combustion chamber 2. Ordinarily, it will be found that 20–40% of the total air required for complete oxidation of the ore will be introduced into fluidized chamber 3 and 80–60% of the total air will be introduced into suspension burner 2. An amount of recycle gas up to 25% entering through line 17, based on the amount of air entering through line 15, will generally be found sufficient to impart the required velocity of the gas stream moving up through the bed of solids 12 in chamber 3.

Attrition of the bed of solids 12 may be promoted by the addition of an inert grinding medium to the bed of solids. This material can consist of silica, alumina, silicon carbide or other inert compounds in the form of either natural or manufactured shapes, which are substantially inert to temperature and withstand erosion and abrasion. Sizes of this medium are to be graduated within the limits of the largest particles which can be properly agitated with the fluidizing gas to the smallest particle which will not be carried out of the system by the exit gas, or stated another way, the inert grinding material should be of a graduated size to be in a fluid state, but not elutriated from the bed of solids. Desirably, the inert grinding material should range from a particle size of about 1/4"–1/8" diameter, down to a size not to exceed about 40 mesh in fineness. The inert grinding medium also functions as a heat storage medium aiding in maintaining uniform temperatures in the bed of solids 12.

A portion of the bed of solids 12 is continuously or intermittently withdrawn through outlet 18 and passed down through conduit 19 into crusher 21 to reduce any agglomerates and massive ore particles which resist the grinding action of the inert material in the bed of solids 12. Crusher 21 may be a water cooled conventional roller crusher having rolls 22 spaced apart a distance of 5/16"–3/16" to avoid crushing the inert grinding medium. The preliminary treatment of the ore in chamber 3 facilitates attrition of the solids because of composition changes due to heating and reaction, internal stress due to thermal shock, and mechanical erosion. The crushed ore from crusher 21 discharges through conduit 23 into cross conveyor 24 which carries the ore to elevator 25 which latter may be a conventional heat-resistant, sealed, bucket elevator or other suitable conveyor, and the ore from the top of elevator 25 flows down through conduit 11 into fluidization chamber 3.

The operation of the process has been described particularly with reference to the treatment of large size raw untreated iron pyrites or pyrrhotite. The process of the present invention is also applicable to the treatment of flotation concentrate which is a by-product from the mining industry and generally consists of finely divided sulfide ore of below 60–80 mesh size. Flotation ore as received, is unsuitable for introduction into a suspension burner and must be given a preliminary treatment because it contains appreciable amounts of moisture and is in the form of agglomerates or clumps. When employing flotation concentrate as the feed charge to the fluidization chamber 3, it may be unnecessary to employ crusher 21 or to employ it only intermittently to break up the agglomerates of ore which are resistant to attrition in chamber 3.

The particles of partially roasted ore suspended in hot gas are released through restricted opening 6 at the top of chamber 3 and are projected upwardly into combustion chamber 2. Additional air from the atmosphere in an amount sufficient to cause complete oxidation of the ore enters through conduit 26 controlled by valve 27 and is forced by air blower 28 through conduits 29–31, thence through a plurality of adjustable air nozzles 32 into chamber 2 wherein the air commingles with the stream of hot gas containing suspended ore patricles and the mixture passes upwardly through suspension burner 2. If desired, only a portion of the air may be supplied by air blower 28, the remainder of the air necessary to effect substantially complete combustion being brought in through a plurality of air ports 33 near the bottom of chamber 2. Additional air may also be introduced in part through induced air ports 40. Ordinarily, the suspension burner 2 operates at a slight sub-atmospheric pressure which makes it unnecessary to employ a blower for the introduction of air through induced air ports 33, 40. During the upward passage of the ore particles through suspension burner 2, a sulfide ore reacts with the oxygen to produce sulfur dioxide and iron oxide. As a result of this highly exothermic reaction, the temperature of the solids in roaster 2 is in excess of 1800° F., generally between 2000-2400° F. A large portion of the cinder remains in finely divided form and is carried out of the suspension burner 2 through line 34. Some of the coarse cinder settles to the bottom of chamber 2. In the particular structure as illustrated in the drawing, provision is made for collecting the coarse cinder in an annular trough 35 bounded by inclined walls 5 of chamber 3 and spaced lower walls of chamber 2. As will be noted, the lower walls 36 of suspension burner 2 are tapered so as to form a narrow annular trough 35 from which the cinder may be discharged by conveyor 37 and removed from the system through line 38. In certain instances it may be desirable to return all or a portion of the coarse cinder product to fluid bed 12, as for example for the purpose of reducing the sulfur content of the cinder. In such event the cinder discharging from conveyor 37 is directed through lines 39 and 19, thence through crusher 21, conduit 23, cross conveyor 24, elevator 25 and conduit 11 into bed 12.

The gases and cinder discharging from the top of suspension burner 2 through conduit 34 pass through conventional waste heat boiler 41 wherein the gases are partially cooled and wherein a portion of the fine cinder settles out and is discharged through line 42 and valve 43. The gases together with some cinder from waste heat boiler 41 pass through conduit 44 into cinder collector 45 wherein further settling of the cinder takes place to be discharged through line 46 and valve 47. The gases leaving cinder collector 45 through line 48 at a temperature of about 600-800° F. are withdrawn to conventional gas purification system and then contact sulfuric acid process for the production of sulfuric acid. A portion of the gases discharging through line 48 are returned via blower 49, line 52 and valves 53 and 54 to the top of suspension burner 2. One of the purposes of returning cooled recycle gas to the top of suspension burner 2 is to maintain a temperature at the top of the burner near the outlet at about 1800° F. to retard fusion of the ore at the outlet of chamber 2. Another portion of the recycled $SO_2$ gas is returned through line 52, valve 55 and line 17 into the inlet of blower 13 wherein it passes upwardly together with air through the bed of solids 12 in chamber 3. A further portion of the recycled $SO_2$ gas may be directed through line 52, valve 56 and line 57 into the inlet of blower 28 wherein it commingles with air and the mixture enters through nozzles 32 into the bottom of suspension burner 2 for the purpose of aiding in controlling the temperature therein.

We claim:

1. Apparatus for effecting fluidization and suspension roasting of metallic sulfide ore which comprises in combination, an enlarged combustion chamber for roasting finely divided iron sulfide ore particles suspended in a gaseous medium, a second smaller fluidization chamber embodied in the bottom of said first chamber with the upper portion of said second chamber extending upwardly into said first chamber and the lower portion of said second chamber extending downwardly from the bottom of said first chamber, the bottom walls of the first chamber being spaced from the upper walls of the second chamber to form an annular trough for the collection of cinder settling in said first chamber, an opening in the upper portion of said second chamber to permit discharge therethrough of gas and finely divided suspended solid particles into the first chamber, a perforated plate in the bottom of the second chamber adapted to support a bed of solids, an ore feed inlet into the second chamber above the perforated plate, an inlet into the second chamber below the perforated plate for the introduction of gas to maintain a bed of solids therein in a fluid state, a gas inlet into the first chamber for the introduction of air, and an outlet near the top of the first chamber for the discharge therefrom of gas containing $SO_2$.

2. Apparatus for effecting fluidization and suspension roasting of metallic sulfide ores which comprises in combination, an enlarged combustion chamber for roasting finely divided sulfide ore particles suspended in a gaseous medium, a second smaller fluidization chamber embodied in the bottom of said first chamber with the upper portion of said second chamber extending upwardly into said first chamber and the lower portion of said second chamber extending downwardly from the bottom of said first chamber, said second chamber having its upper walls inwardly inclined forming a restricted opening at the top of the second chamber, a perforated plate in the bottom of the second chamber adapted to support a bed of solids, an ore feed inlet into the second chamber above the perforated plate, an inlet into the second chamber below the perforated plate for the introduction of gas to maintain a bed of solids therein in a fluid state, a gas inlet into the first chamber for the introduction of air, and an outlet near the top of the first chamber for the discharge therefrom of gas containing $SO_2$.

3. Apparatus for effecting fluidization and suspension roasting of metallic sulfide ores which comprises in combination, an enlarged combustion chamber for roasting finely divided sulfide ore particles suspended in a gaseous medium, a second smaller fluidization chamber embodied in the bottom of said first chamber with the upper portion of said second chamber extending upwardly into said first chamber and the lower portion of said second chamber extending downwardly from the bottom of said first chamber, said second chamber having its upper walls inwardly inclined forming a restricted opening at the top of the second chamber, a perforated plate in the bottom of the second chamber adapted to support a bed of solids, an ore feed inlet into the second chamber above the perforated plate, an inlet into the second chamber below the perforated plate for the introduction of gas to maintain a bed of solids therein in a fluid state, a gas inlet into the first chamber for the introduction of air, a discharge conduit connected to the second chamber above the perforated plate for the withdrawal of a portion of the bed of solids, a crusher for crushing large particles of ore withdrawn from the bed of solids, a conveyor for returning the crushed ore to the bed of solids in the second chamber, an outlet in the annular trough for the discharge of cinder from the bottom of the first chamber, and an outlet near the top of the first chamber for the discharge therefrom of gas containing $SO_2$.

4. Apparatus for effecting fluidization and suspension roasting of metallic sulfide ores which comprises in combination, an enlarged combustion chamber for roasting finely divided sulfide ore particles suspended in a gaseous medium, a second smaller fluidization chamber embodied in the bottom of said first chamber with the upper portion of said second chamber extending upwardly into said first chamber and the lower portion of said second chamber extending downwardly from the bottom of said first chamber, said second chamber having its upper walls inwardly inclined forming a restricted opening at the top of the second chamber adapted to support a bed of solids, an ore feed inlet into the second chamber above the perforated plate, an inlet into the second chamber below the perforated plate for the introduction of gas to maintain a bed of solids therein in a fluid state, a gas inlet into the first chamber for the introduction of air, a discharge conduit connected to the second chamber above the perforated plate for the withdrawal of a portion of the bed of solids, a crusher for crushing large particles of ore withdrawn from the bed of solids, a conveyor for returning the crushed ore to the bed of solids in the second chamber, an outlet in the annular trough for the discharge of cinder from the bottom of the first chamber, an outlet near the top of the first chamber for the discharge therefrom of gas containing $SO_2$, conduit means for recycling a portion of the gas containing $SO_2$ to the second chamber, and conduit means for recycling a portion of the gas containing $SO_2$ to the first chamber.

5. Apparatus for effecting fluidization and suspension roasting of iron sulfide ores which comprises in combination, an enlarged combustion chamber for roasting finely divided iron sulfide ore particles suspended in a gaseous medium, a second smaller fluidization chamber embodied in the bottom of said first chamber with the upper portion of said second chamber extending upwardly into said first chamber and the lower portion of said second chamber extending downwardly from the bottom of said first chamber, the bottom walls of the first chamber being spaced from the upper walls of the second chamber to form an annular trough for the collection of cinder settling in said first chamber, said second chamber having its upper walls inwardly inclined forming a restricted opening at the top of the second chamber, a perforated plate in the lower half of the second chamber adapted to support a bed of solids, an ore feed inlet into the second chamber above the perforated plate, an inlet into the second chamber below the perforated plate for the introduction of gas to maintain a bed of solids therein in a fluid state, a discharge conduit connected to the second chamber above the perforated plate for the withdrawal of a portion of the bed of solids, a crusher for crushing large particles of ore withdrawn from the bed of solids, a conveyor for returning the crushed ore to the bed of solids in the second chamber, an outlet in the annular trough for the discharge of cinder from the bottom of the first chamber, an inlet near the bottom of the first chamber for the introduction of air, an outlet from the top of the first chamber for the discharge therefrom of gas containing $SO_2$, a waste heat boiler for recovering heat from the gas containing $SO_2$ connected to said discharge outlet, a cinder collector chamber for separating cinder from the cooled gas discharged from the waste heat boiler, a conduit connected to the cinder collector for the discharge of gas containing $SO_2$, conduit means for recycling a portion of the gas containing $SO_2$ to the second chamber, and conduit means for recycling a portion of the gas containing $SO_2$ to the top of the first chamber.

6. Apparatus for effecting fluidization and suspension roasting of metallic sulfide ores which comprises in combination, an enlarged suspension combustion chamber for roasting finely divided metal sulfide ore particles suspended in a gaseous medium, a second smaller fluidization chamber embodied in the bottom of said suspension chamber with the walls of the fluidization chamber extending upwardly into said suspension chamber, the bottom walls of the suspension chamber being spaced from the upwardly extending walls of the fluidization chamber to form an annular trough for the collection of cinder settling in the suspension chamber, an opening in the upper portion of said fluidization chamber to permit discharge therethrough of gas and finely divided suspended solid particles into the suspension chamber, a perforated plate in the bottom of the fluidization chamber adapted to support a fluidized bed of solids, an ore feed inlet into the fluidization chamber above the perforated plate, an inlet into the fluidization chamber below the perforated plate for the introduction of gas to maintain a bed of solids therein in a fluid state, an air inlet for the introduction of air into the suspension chamber, and an outlet near the top of the suspension chamber for the discharge therefrom of gas containing $SO_2$.

References Cited in the file of this patent

UNITED STATES PATENTS

| | | |
|---|---|---|
| 1,941,592 | Bacon et al. | Jan. 2, 1934 |
| 1,979,448 | Cannon | Nov. 6, 1934 |
| 2,030,021 | Ingraham | Feb. 4, 1936 |
| 2,088,679 | Yamazaki et al. | Aug. 3, 1937 |
| 2,503,788 | White | Apr. 11, 1950 |
| 2,548,642 | White | Apr. 10, 1951 |
| 2,625,464 | Roberts et al. | Jan. 13, 1953 |
| 2,671,719 | Lewis et al. | Mar. 9, 1954 |